(12) United States Patent
Tzirkel-Hancock et al.

(10) Patent No.: US 10,422,903 B2
(45) Date of Patent: Sep. 24, 2019

(54) METHOD AND SYSTEM FOR DETERMINING AN INTENDED DESTINATION

(71) Applicant: GM GLOBAL TECHNOLOGY OPERATIONS LLC, Detroit, MI (US)

(72) Inventors: Eli Tzirkel-Hancock, Ra'Anana (IL); Ilan Malka, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 116 days.

(21) Appl. No.: 15/664,435

(22) Filed: Jul. 31, 2017

(65) Prior Publication Data
US 2019/0033090 A1   Jan. 31, 2019

(51) Int. Cl.
| | | |
|---|---|---|
| *G01C 21/36* | (2006.01) | |
| *G01C 21/34* | (2006.01) | |
| *G01V 1/30* | (2006.01) | |
| *G01V 99/00* | (2009.01) | |
| *G01V 1/40* | (2006.01) | |
| *E21B 49/00* | (2006.01) | |
| *G01V 1/34* | (2006.01) | |
| *G01V 1/28* | (2006.01) | |

(52) U.S. Cl.
CPC .............. *G01V 1/306* (2013.01); *E21B 49/00* (2013.01); *G01V 1/28* (2013.01); *G01V 1/345* (2013.01); *G01V 1/40* (2013.01); *G01V 99/005* (2013.01)

(58) Field of Classification Search
CPC ........................ G01C 21/3617; G01C 21/3484
See application file for complete search history.

(56) References Cited

U.S. PATENT DOCUMENTS

| | | | | |
|---|---|---|---|---|
| 8,073,460 | B1* | 12/2011 | Scofield ................ | H04W 4/21 455/456.1 |
| 9,516,470 | B1* | 12/2016 | Scofield ................ | H04W 4/21 |
| 9,574,894 | B1* | 2/2017 | Karakotsios ....... | G01C 21/3617 |
| 10,042,359 | B1* | 8/2018 | Konrardy ............. | G05D 1/0088 |
| 10,068,251 | B1* | 9/2018 | Scofield ............ | G06Q 30/0255 |
| 2006/0069503 | A1* | 3/2006 | Suomela ............ | G01C 21/3641 701/431 |
| 2006/0229802 | A1* | 10/2006 | Vertelney ........... | G01C 21/3617 701/532 |
| 2010/0191466 | A1* | 7/2010 | DeLuca ............... | G01C 21/362 701/469 |
| 2012/0250540 | A1* | 10/2012 | Smartt ................. | H04L 12/189 370/252 |
| 2012/0310736 | A1* | 12/2012 | Vengroff ............... | G06Q 30/02 705/14.53 |
| 2013/0345965 | A1* | 12/2013 | Kirmse ................ | G01S 5/0027 701/422 |

(Continued)

*Primary Examiner* — Mussa A Shaawat
(74) *Attorney, Agent, or Firm* — Cantor Colburn LLP

(57) ABSTRACT

A system and method for determining an intended destination is disclosed. The method includes receiving, by a geolocation processor, a mobile device location. The mobile device location corresponds to a location of a mobile device of a vehicle user. The vehicle user has parked a vehicle at a parking location different than the mobile device location. The method also includes storing the parking location or the mobile device location as an intended destination of the vehicle user based at least on a determining of which of the parking location or the mobile device location corresponds to the intended destination of the vehicle user.

20 Claims, 3 Drawing Sheets

(56) References Cited

U.S. PATENT DOCUMENTS

| | | | |
|---|---|---|---|
| 2014/0210822 A1* | 7/2014 | Raley | G06T 15/80 |
| | | | 345/426 |
| 2014/0320318 A1* | 10/2014 | Victor | G08G 1/142 |
| | | | 340/932.2 |
| 2015/0112919 A1* | 4/2015 | Weir | G01C 21/3476 |
| | | | 706/52 |
| 2015/0254721 A1* | 9/2015 | Rad | G06Q 30/0266 |
| | | | 705/14.63 |
| 2016/0012726 A1* | 1/2016 | Wang | G08G 1/0112 |
| | | | 340/932.2 |
| 2016/0131491 A1* | 5/2016 | Nelson | G06Q 50/14 |
| | | | 701/522 |
| 2016/0155332 A1* | 6/2016 | Wang | G01C 21/3685 |
| | | | 340/932.2 |
| 2016/0183060 A1* | 6/2016 | Seyde | H04W 4/029 |
| | | | 455/456.3 |
| 2017/0052034 A1* | 2/2017 | Magazinik | G01C 21/3438 |
| 2017/0262790 A1* | 9/2017 | Khasis | G05D 1/0287 |
| 2018/0112995 A1* | 4/2018 | Bortolussi | G01C 21/3679 |
| 2018/0188058 A1* | 7/2018 | Dabholkar | G01C 21/3679 |

\* cited by examiner

METHOD AND SYSTEM FOR DETERMINING AN INTENDED DESTINATION

INTRODUCTION

The subject embodiments relate to determining an intended destination. Specifically, one or more embodiments determine an intended destination by using a geolocation functionality of a mobile device, for example.

Current vehicles can use geolocation technology such as, for example, Global Positioning System (GPS) technology to receive geolocation information and time information. Current vehicles use the received geolocation information to navigate to intended destinations. The vehicle systems can store different locations so that these locations are conveniently accessible to drivers for planning future trips. For example, the different locations can be stored as "recently visited locations," "favorites," or as "frequently visited locations."

SUMMARY

In one exemplary embodiment, a method includes receiving, by a geolocation processor, a mobile device location. The mobile device location corresponds to a location of a mobile device of a vehicle user. The vehicle user has parked a vehicle at a parking location different than the mobile device location. The method also includes storing the parking location or the mobile device location as an intended destination of the vehicle user based at least on a determination of which of the parking location or the mobile device location corresponds to the intended destination of the vehicle user.

In another exemplary embodiment, the method also includes receiving the parking location. The parking location is received from a navigation system of the vehicle, and the geolocation processor is in communication with a transceiver of the vehicle. The method can also include initially storing the parking location as the intended destination of the vehicle user, and replacing the stored parking location with the mobile device location based on determining that the mobile device location corresponds to the intended destination.

In another exemplary embodiment, the method also includes receiving an indication from the vehicle user. The indication indicates which of the parking location or the mobile device location corresponds to the intended destination of the vehicle user. The determination of which of the parking location or the mobile device location corresponds to the intended destination is based on the received indication.

In another exemplary embodiment, the method also includes prompting the vehicle user to provide the indication after a predetermined amount of time upon receiving the parking location.

In another exemplary embodiment, the method also includes prompting the vehicle user to provide the indication after detecting that the mobile device has stopped moving for a threshold amount of time. The mobile device location is determined based on at least one of accelerometer measurements performed by the mobile device, a web history of the mobile device, and a map destination indicated within a map application of the mobile device.

In another exemplary embodiment, a system within a geolocation server/processor includes an electronic controller configured to receive a mobile device location. The mobile device location corresponds to a location of a mobile device of a vehicle user. The vehicle user has parked a vehicle at a parking location different than the mobile device location. The electronic controller is also configured to store the parking location or the mobile device location as an intended destination of the vehicle user based at least on a determination of which of the parking location or the mobile device location corresponds to the intended destination of the vehicle user.

In another exemplary embodiment, the electronic controller is further configured to receive the parking location. The parking location is received from a navigation system of the vehicle, and the electronic controller is in communication with a transceiver of the vehicle. The electronic controller is further configured to initially store the parking location as the intended destination of the vehicle user, and replace the stored parking location with the mobile device location based on determining that the mobile device location corresponds to the intended destination.

In another exemplary embodiment, the electronic controller is further configured to receive an indication from the vehicle user. The indication indicates which of the parking location or the mobile device location corresponds to the intended destination of the vehicle user, and the determination of which of the parking location or the mobile device location corresponds to the intended destination is based on the received indication.

In another exemplary embodiment, the electronic controller is further configured to prompt the vehicle user to provide the indication after a predetermined amount of time upon receiving the parking location.

In another exemplary embodiment, the electronic controller is further configured to prompt the vehicle user to provide the indication after detecting that the mobile device has stopped moving for a threshold amount of time. The mobile device location is determined based on at least one of accelerometer measurements performed by the mobile device, a web history of the mobile device, and a map destination indicated within a map application of the mobile device.

In another exemplary embodiment, the method includes transmitting, by an electronic controller of a vehicle, a parking location. The parking location is transmitted to a geolocation processor, and the parking location corresponds to a parking location at which a vehicle user has parked the vehicle. The electronic controller of the vehicle transmits the parking location with a transceiver of the vehicle. The method also includes displaying a stored intended destination of the vehicle user. The geolocation processor received a mobile device location that corresponds to a location of a mobile device of the vehicle user, the geolocation processor determined which of the parking location and the mobile device location corresponds to the intended destination. The geolocation processor stored the parking location or the mobile device location as the intended destination of the vehicle user based on the determination of the geolocation processor.

In another exemplary embodiment, the parking location is initially stored as the intended destination of the vehicle user, and the stored parking location is replaced with the mobile device location based on a determination that the mobile device location corresponds to the intended destination.

In another exemplary embodiment, the geolocation processor received an indication from the vehicle user, the indication indicated which of the parking location or the mobile device location corresponds to the intended destination of the vehicle user, and the determination of the geolocation processor is based on the received indication.

In another exemplary embodiment, the geolocation processor prompted the vehicle user to provide the indication after a predetermined amount of time upon receiving the parking location.

In another exemplary embodiment, the geolocation processor prompted the vehicle user to provide the indication after detecting that the mobile device had stopped moving for a threshold amount of time. The mobile device location is determined based on at least one of accelerometer measurements performed by the mobile device, a web history of the mobile device, and a map destination indicated within a map application of the mobile device.

In another exemplary embodiment, a system within a vehicle includes an electronic controller configured to transmit a parking location. The parking location is transmitted to a geolocation processor, and the parking location corresponds to a parking location at which a vehicle user has parked the vehicle. The electronic controller of the vehicle is configured to transmit the parking location with a transceiver of the vehicle. The electronic controller is also configured to display a stored intended destination of the vehicle user. The geolocation processor received a mobile device location that corresponds to a location of a mobile device of the vehicle user. The geolocation processor determined which of the parking location and the mobile device location corresponds to the intended destination, and the geolocation processor stored the parking location or the mobile device location as the intended destination of the vehicle user based on the determination of the geolocation processor.

In another exemplary embodiment, the parking location is initially stored as the intended destination of the vehicle user, and the stored parking location is replaced with the mobile device location based on a determination that the mobile device location corresponds to the intended destination.

In another exemplary embodiment, the geolocation processor received an indication from the vehicle user, the indication indicated which of the parking location or the mobile device location corresponds to the intended destination of the vehicle user, and the determination of the geolocation processor is based on the received indication.

In another exemplary embodiment, the geolocation processor prompted the vehicle user to provide the indication after a predetermined amount of time upon receiving the parking location.

In another exemplary embodiment, the geolocation processor prompted the vehicle user to provide the indication after detecting that the mobile device had stopped moving for a threshold amount of time. The mobile device location is determined based on at least one of accelerometer measurements performed by the mobile device, a web history of the mobile device, and a map destination indicated within a map application of the mobile device.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
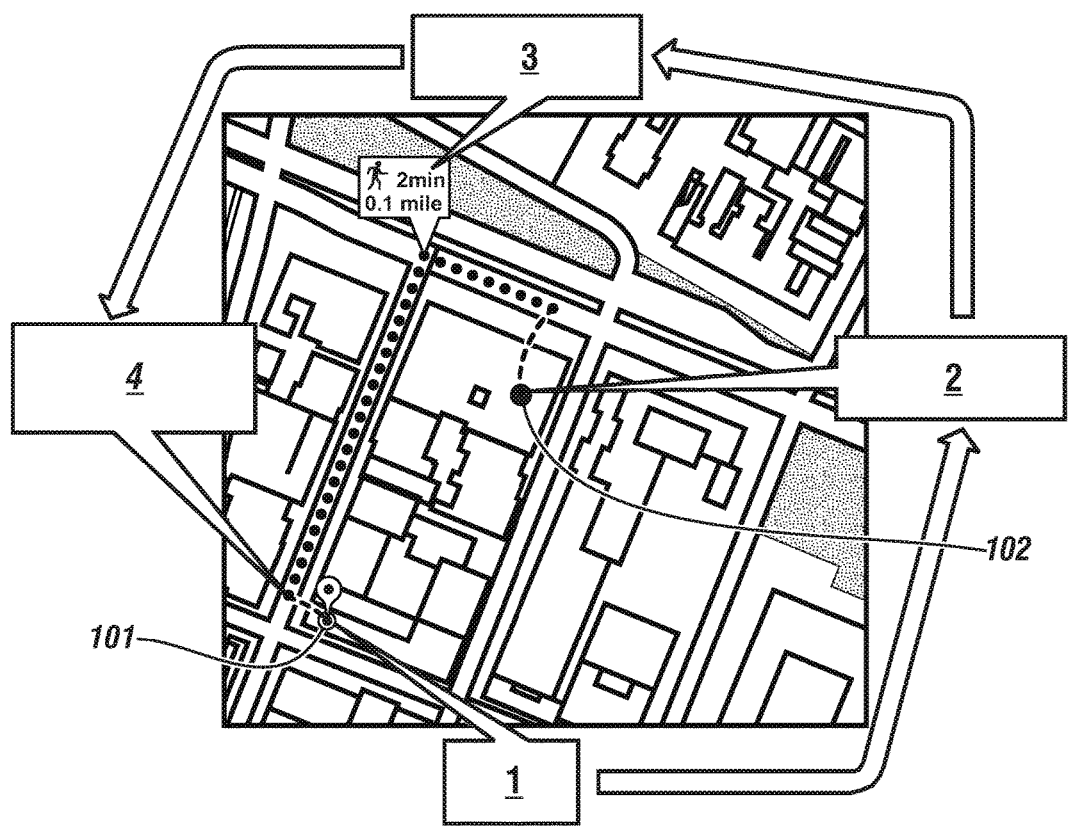
FIG. 1 illustrates an example system for determining an intended destination by using a geolocation functionality of a mobile device, in accordance with one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Previously-visited destinations can be derived from locations where a vehicle has been parked by a vehicle user. A vehicle user can be a driver and/or a passenger, for example. Once a parking location has been detected and has been stored as a visited destination, the vehicle can suggest the parking location to a vehicle user as a destination for future trips.

In many cases, the vehicle user may park the vehicle at a location that is a distance away from the intended destination of the vehicle user, where the intended destination of the vehicle user can be considered to be the destination that the vehicle user seeks to reach at the outset of the trip. In this case, if the location (at which the vehicle is parked) is stored as a visited destination, the vehicle user may be unfamiliar with the stored destination because the stored destination does not correspond to the intended destination.

Further, because there may be multiple possible parking locations that are located a distance away from the intended location, if multiple parking locations are stored, then multiple distinct locations will be stored as being visited as opposed to storing a single intended destination.

In view of the above-described difficulties, one or more embodiments are directed to a method of using a companion mobile device application that is configured to detect an intended destination by using geolocation functions of a mobile device that the mobile device application is installed upon. The companion mobile device application can also be configured to communicate the intended destination back to the vehicle and/or geolocation server/processor. As described in more detail below, the companion mobile device application can be installed on a mobile device of the vehicle user. The vehicle user can be a driver or a passenger of the vehicle. Within an autonomous vehicle, the vehicle user can direct the autonomous vehicle.

By using a mobile device, one or more embodiments can capture an intended destination of a vehicle user, which can be different than an actual parking spot that is occupied by the vehicle user. The mobile device can be a smartphone, a tablet computer, a laptop, a wearable computer, a personal digital assistant, a pager, and/or any other type of personal computing device, for example. The parking spot that is occupied by the vehicle user can be located a distance away from the intended destination of the vehicle user.

FIG. 1 illustrates an example system for determining an intended destination by integrating mapping functionality with mobile device functionality, in accordance with one or more embodiments. At step 1, a vehicle user drives a vehicle towards an intended destination. In the example of FIG. 1, the vehicle user intends to drive the vehicle to "Mission Cantina" location 101. However, at step 2, suppose that the vehicle user parks the vehicle at a "Parking" location 102 that is located a distance away from intended destination "Mission Cantina" location 101. The vehicle user may need to park away from the intended destination because there may not be sufficient parking space at the intended destination, for example.

Because the vehicle has been parked within "Parking" location 102 (as opposed to parking at the exact intended destination), a navigation system of the vehicle will initially transmit the "Parking" location 102 to a geolocation processor to be stored as a visited destination. However, as described above, it would be preferable for the geolocation processor to store the actual intended location ("Mission Cantina" location 101) as the visited destination rather than storing the "Parking" location 102 as the visited destination.

At step 3, the vehicle user walks from the "Parking" location 102 to the intended destination. The vehicle user has possession of a mobile device while walking to the intended destination. At step 4, the vehicle user arrives at the intended destination "Mission Cantina" location 101, and this intended destination is detected by the mobile device of the vehicle user. The mobile device transmits the intended destination to the geolocation processor, and the previously-stored "Parking" location 102 is updated/replaced with the intended destination "Mission Cantina" location 101. Therefore, one or more embodiments determine an intended vehicle destination by integrating map functionality with mobile device functionality, for example. As described above, a mobile device application can be installed upon the mobile device to operate in conjunction with the mobile device.

Figure 2:
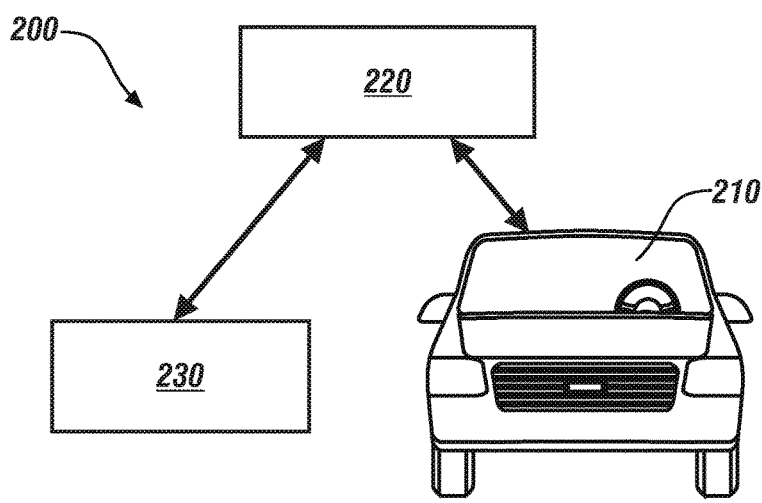
FIG. 2 illustrates an example system that is configured to determine an intended destination, in accordance with one or more embodiments.

FIG. 2 illustrates an example system that is configured to determine an intended vehicle destination, in accordance with one or more embodiments. System 200 includes a vehicle 210, a geolocation processor 220, and a mobile device 230, for example. Vehicle 210 can be equipped with a GPS navigation system that allows vehicle 210 to communicate with geolocation processor 220. The GPS navigation system can include one or more transceivers and/or receivers that facilitate the communication.

Vehicle 210 (via the equipped GPS navigation system) can transmit coordinates of the parking location to the geolocation processor 220. Geolocation processor 220 can save a received location as a visited location (i.e., saving a parking location as a "Recently Visited location," "Frequently Visited location," and/or "Favorite location").

Once the vehicle user reaches the intended destination, the vehicle user uses mobile device 230 to send the coordinates of the reached intended destination to geolocation processor 220, and geolocation processor 220 can then save the intended destination in place of a previously saved parking location. Mobile device 230 can communicate with geolocation processor 220 via an installed mobile device application, as described above, for example.

Figure 3:
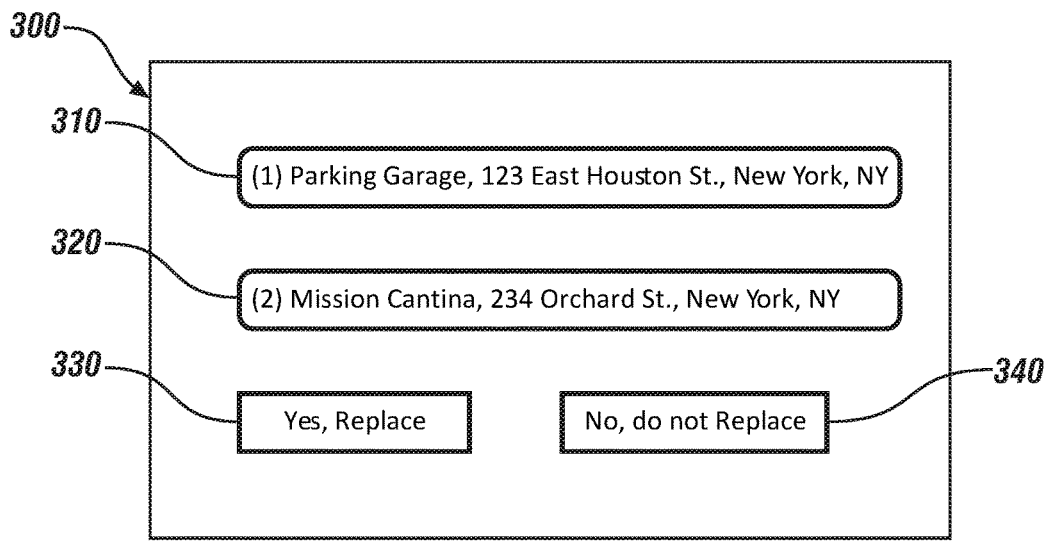
FIG. 3 illustrates an example interface that is configured to confirm an intended destination, in accordance with one or more embodiments.

FIG. 3 illustrates an interface that is configured to confirm an intended destination, in accordance with one or more embodiments. Interface 300 can be provided by the mobile device application and can be displayed upon the screen of mobile device 230. Interface 300 can prompt the vehicle user to confirm that the address of the intended destination 320 (which has been reached by the vehicle user) should replace the previously stored parking location 310. In one or more embodiments, if the user clicks on button 330, then the user confirms that the address of the intended destination 320 should replace the previously stored parking location 310. On the other hand, if the user clicks on button 340, the user confirms that the address of the intended destination 320 should not replace the previously stored parking location 310. In one or more embodiments, the vehicle user can trigger display of interface 300. For example, upon arriving at the intended destination, the vehicle user can activate display interface 300 and thus activate replacement of the previously-stored parking location 310 with the intended address 320. In other embodiments, geolocation processor 220 can trigger display of interface 300. For example, after storing the parking location as a visited location, geolocation processor 220 can trigger display of interface 300 after a predetermined amount of time (i.e., 5 minutes, 10 minutes, and/or 15 minutes) in order to allow the vehicle user time to reach the intended destination. In another embodiment, geolocation processor 220 can trigger display of interface 300 after detecting that mobile device 230 has stopped moving for a threshold amount of time, which can indicate that the vehicle user has finally reached the intended destination. One or more embodiments would then display interface 300 to the vehicle user.

Figure 4:
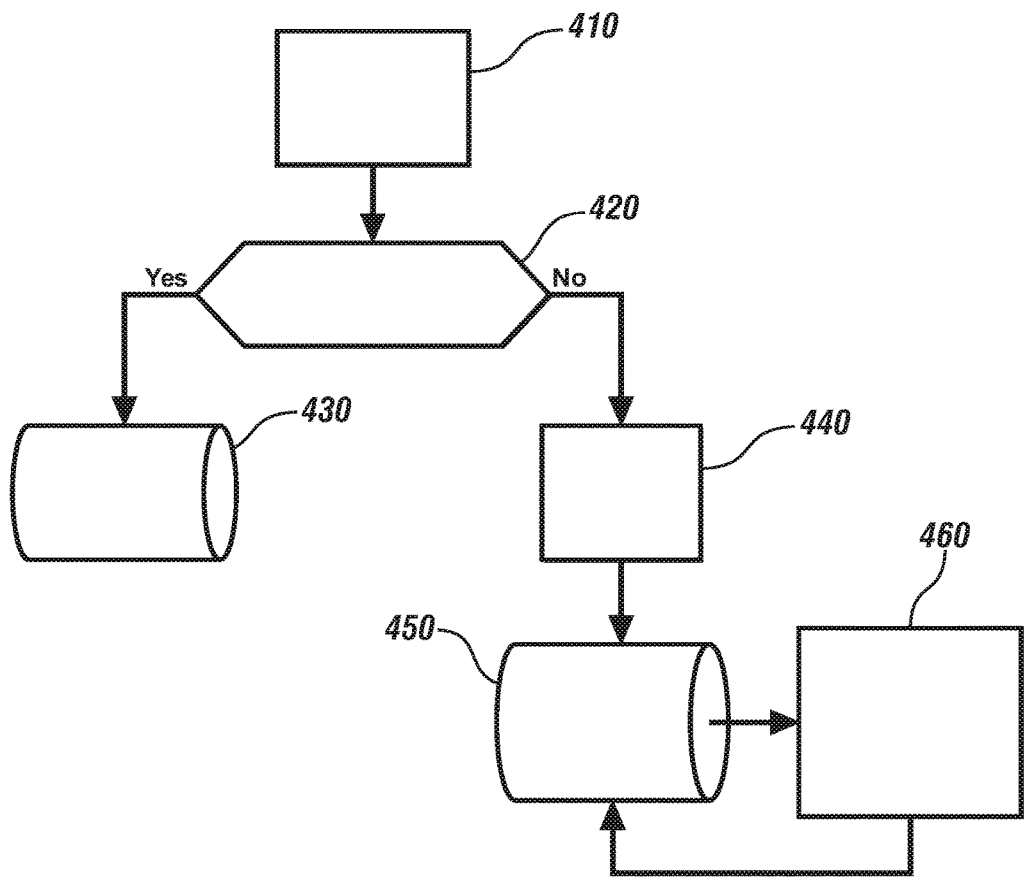
FIG. 4 depicts a flowchart of a method in accordance with one or more embodiments.

FIG. 4 illustrates a flow chart of a method in accordance with one or more embodiments. At step 410, a vehicle user begins driving the vehicle. At step 420, once the vehicle comes to a stop, one or more embodiments determine whether any input has been received from the vehicle user. Specifically, one or more embodiments determine whether the vehicle user has inputted an intended destination, which, in turn, requests turn-by-turn directions from the navigation system to reach the intended destination. If the vehicle user inputs a destination and requested turn-by-turn (TBT) instructions, then TBT navigation information is provided, and the input destination is stored within a visited destination list at step 430. However, if the vehicle user does not input a destination, then one or more embodiments detect the location at which the vehicle is parked at step 440. At step 450, the detected parking location is initially stored/inserted within the visited/destination list. At step 460, if a mobile device of the vehicle user detects that the intended location is different from the detected parking location, then one or more embodiments replaces the stored parking location with the determined intended location (as reflected by the location of the mobile device).

Figure 5:
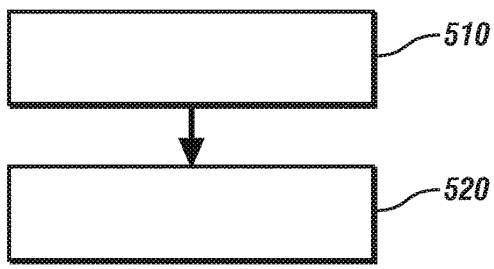
FIG. 5 depicts a flowchart of another method in accordance with one or more embodiments.

FIG. 5 depicts a flowchart of a method in accordance with one or more embodiments. The method can include, at block 510, receiving, by a geolocation processor, a mobile device location. The mobile device location corresponds to a location of a mobile device of a vehicle user. The vehicle user has parked a vehicle at a parking location different than the mobile device location. The method can also include, at block 520, storing the parking location or the mobile device location as an intended destination of the vehicle user based at least on a determining of which of the parking location or the mobile device location corresponds to the intended destination of the vehicle user.

Figure 6:
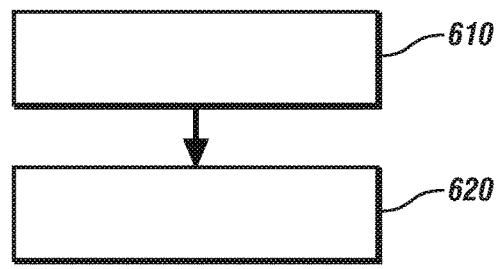
FIG. 6 depicts a flowchart of another method in accordance with one or more embodiments.

FIG. 6 depicts a flowchart of another method in accordance with one or more embodiments. The method can include, at block 610, transmitting, by an electronic controller of a vehicle, a parking location. The parking location is transmitted to a geolocation processor, and the parking location corresponds to a parking location at which a vehicle user has parked the vehicle. The electronic controller of the vehicle transmits the parking location with a transceiver of the vehicle. The method can also include, at block 620, displaying a stored intended destination of the vehicle user. The geolocation processor received a mobile device location that corresponds to a location of a mobile device of the vehicle user, the geolocation processor determined which of the parking location and the mobile device location corresponds to the intended destination, and the geolocation processor stored the parking location or the mobile device location as the intended destination of the vehicle user based on the determination of the geolocation processor.

Figure 7:
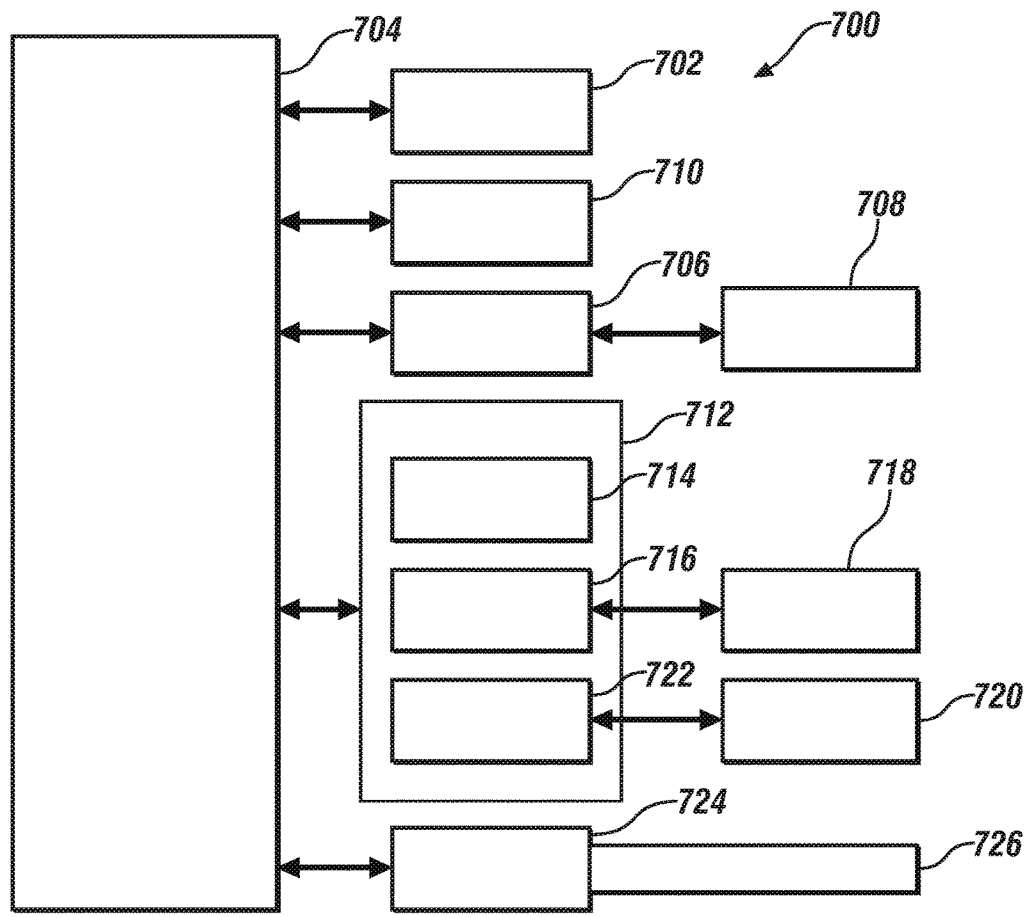
FIG. 7 depicts a high-level block diagram of a computing system, which can be used to implement one or more embodiments.

FIG. 7 depicts a high-level block diagram of a computing system 700, which can be used to implement one or more embodiments. Computing system 700 can correspond to, at least, an electronic controller of a navigation system of a vehicle, as described above, for example. Computing system 700 can also correspond to, at least, an electronic controller of a geolocation server and/or a geolocation processor, for example. Computing system 700 can also correspond to, at least, a mobile device. Computing system 700 can be used to implement hardware components of systems capable of performing methods described herein.

Although one exemplary computing system 700 is shown, computing system 700 includes a communication path 726, which connects computing system 700 to additional systems (not depicted). Computing system 700 and additional system are in communication via communication path 726, e.g., to communicate data between them.

Computing system 700 includes one or more processors, such as processor 702. Processor 702 is connected to a communication infrastructure 704 (e.g., a communications bus, cross-over bar, or network). Computing system 700 can include a display interface 706 that forwards graphics, textual content, and other data from communication infrastructure 704 (or from a frame buffer not shown) for display on a display unit 708. Display unit 708 can correspond to at least a portion of a dashboard of a vehicle, for example. Computing system 700 also includes a main memory 710, preferably random access memory (RAM), and can also include a secondary memory 712. There also can be one or more disk drives 714 contained within secondary memory 712. Removable storage drive 716 reads from and/or writes to a removable storage unit 718. As will be appreciated, removable storage unit 718 includes a computer-readable medium having stored therein computer software and/or data.

In alternative embodiments, secondary memory 712 can include other similar means for allowing computer programs or other instructions to be loaded into the computing system. Such means can include, for example, a removable storage unit 720 and an interface 722.

In the present description, the terms "computer program medium," "computer usable medium," and "computer-readable medium" are used to refer to media such as main memory 710 and secondary memory 712, removable storage drive 716, and a disk installed in disk drive 714. Computer programs (also called computer control logic) are stored in main memory 710 and/or secondary memory 712. Computer programs also can be received via communications interface 724. Such computer programs, when run, enable the computing system to perform the features discussed herein. In particular, the computer programs, when run, enable processor 702 to perform the features of the computing system. Accordingly, such computer programs represent controllers of the computing system. Thus it can be seen from the forgoing detailed description that one or more embodiments provide technical benefits and advantages.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the invention not be limited to the particular embodiments disclosed, but will include all embodiments falling within the scope of the application.

What is claimed is:

1. A method, the method comprising:
receiving, by a geolocation processor, a mobile device location, wherein the mobile device location corresponds to a location of a mobile device of a vehicle user, and the vehicle user has parked a vehicle at a parking location different than the mobile device location;
storing the parking location or the mobile device location as an intended destination of the vehicle user based at least on a determination of which of the parking location or the mobile device location corresponds to the intended destination of the vehicle user; and
providing access to the intended destination to the vehicle user for future trips.

2. The method of claim 1, further comprising:
receiving the parking location, wherein the parking location is received from a navigation system of the vehicle, and the geolocation processor is in communication with a transceiver of the vehicle;
initially storing the parking location as the intended destination of the vehicle user; and
replacing the stored parking location with the mobile device location based on determining that the mobile device location corresponds to the intended destination.

3. The method of claim 1, further comprising receiving an indication from the vehicle user, wherein the indication indicates which of the parking location or the mobile device location corresponds to the intended destination of the vehicle user, and the determination of which of the parking location or the mobile device location corresponds to the intended destination is based on the received indication.

4. The method of claim 3, further comprising prompting the vehicle user to provide the indication after a predetermined amount of time upon receiving the parking location.

5. The method of claim 3, further comprising prompting the vehicle user to provide the indication after detecting that the mobile device has stopped moving for a threshold amount of time, wherein the mobile device location is determined based on at least one of accelerometer measurements performed by the mobile device, a web history of the mobile device, and a map destination indicated within a map application of the mobile device.

6. A system within a geolocation processor, comprising:
an electronic controller configured to:
receive a mobile device location, wherein the mobile device location corresponds to a location of a mobile device of a vehicle user, and the vehicle user has parked a vehicle at a parking location different than the mobile device location;

store the parking location or the mobile device location as an intended destination of the vehicle user based at least on a determination of which of the parking location or the mobile device location corresponds to the intended destination of the vehicle user; and provide access to the intended destination to the vehicle user for future trips.

7. The system of claim 6, wherein the electronic controller is further configured to:

receive the parking location, wherein the parking location is received from a navigation system of the vehicle, and the electronic controller is in communication with a transceiver of the vehicle;

initially store the parking location as the intended destination of the vehicle user; and replace the stored parking location with the mobile device location based on determining that the mobile device location corresponds to the intended destination.

8. The system of claim 6, wherein the electronic controller is further configured to receive an indication from the vehicle user, wherein the indication indicates which of the parking location or the mobile device location corresponds to the intended destination of the vehicle user, and the determination of which of the parking location or the mobile device location corresponds to the intended destination is based on the received indication.

9. The system of claim 8, wherein the electronic controller is further configured to prompt the vehicle user to provide the indication after a predetermined amount of time upon receiving the parking location.

10. The system of claim 8, wherein the electronic controller is further configured to prompt the vehicle user to provide the indication after detecting that the mobile device has stopped moving for a threshold amount of time, wherein the mobile device location is determined based on at least one of accelerometer measurements performed by the mobile device, a web history of the mobile device, and a map destination indicated within a map application of the mobile device.

11. A method, the method comprising:

transmitting, by an electronic controller of a vehicle, a parking location, wherein the parking location is transmitted to a geolocation processor, the parking location corresponds to a parking location at which a vehicle user has parked the vehicle, and the electronic controller of the vehicle transmits the parking location with a transceiver of the vehicle; and displaying a stored intended destination of the vehicle user, wherein the geolocation processor receives a mobile device location that corresponds to a location of a mobile device of the vehicle user, the geolocation processor determined which of the parking location and the mobile device location corresponds to the intended destination, and the geolocation processor stores the parking location or the mobile device location as the intended destination of the vehicle user based on the determination of the geolocation processor.

12. The method of claim 11, wherein the parking location is initially stored as the intended destination of the vehicle user, and the stored parking location is replaced with the mobile device location based on a determination that the mobile device location corresponds to the intended destination.

13. The method of claim 11, wherein the geolocation processor received an indication from the vehicle user, the indication indicated which of the parking location or the mobile device location corresponds to the intended destination of the vehicle user, and the determination of the geolocation processor is based on the received indication.

14. The method of claim 13, wherein the geolocation processor prompted the vehicle user to provide the indication after a predetermined amount of time upon receiving the parking location.

15. The method of claim 13, wherein the geolocation processor prompted the vehicle user to provide the indication after detecting that the mobile device had stopped moving for a threshold amount of time, wherein the mobile device location is determined based on at least one of accelerometer measurements performed by the mobile device, a web history of the mobile device, and a map destination indicated within a map application of the mobile device.

16. A system within a vehicle, comprising:

an electronic controller configured to:

transmit a parking location, wherein the parking location is transmitted to a geolocation processor, the parking location corresponds to a parking location at which a vehicle user has parked the vehicle, and the electronic controller of the vehicle is configured to transmit the parking location with a transceiver of the vehicle; and display a stored intended destination of the vehicle user, wherein the geolocation processor receives a mobile device location that corresponds to a location of a mobile device of the vehicle user, the geolocation processor determined which of the parking location and the mobile device location corresponds to the intended destination, and the geolocation processor stores the parking location or the mobile device location as the intended destination of the vehicle user based on the determination of the geolocation processor.

17. The system of claim 16, wherein the parking location is initially stored as the intended destination of the vehicle user, and the stored parking location is replaced with the mobile device location based on a determination that the mobile device location corresponds to the intended destination.

18. The system of claim 16, wherein the geolocation processor received an indication from the vehicle user, the indication indicated which of the parking location or the mobile device location corresponds to the intended destination of the vehicle user, and the determination of the geolocation processor is based on the received indication.

19. The system of claim 18, wherein the geolocation processor prompted the vehicle user to provide the indication after a predetermined amount of time upon receiving the parking location.

20. The system of claim 18, wherein the geolocation processor prompted the vehicle user to provide the indication after detecting that the mobile device had stopped moving for a threshold amount of time, wherein the mobile device location is determined based on at least one of accelerometer measurements performed by the mobile device, a web history of the mobile device, and a map destination indicated within a map application of the mobile device.

* * * * *